United States Patent

Dunne et al.

[15] 3,654,616

[45] Apr. 4, 1972

[54] PROGRAM SELECTION ARRANGEMENT FOR MANIPULATOR APPARATUS

[72] Inventors: Maurice J. Dunne, Newtown; Robert E. Correll, Middlebury; Joseph Albert Picard, Jr., Ansonia, all of Conn.

[73] Assignee: Unimation, Inc., Bethel, Conn.

[22] Filed: June 29, 1970

[21] Appl. No.: 50,441

[52] U.S. Cl. ............................ 340/172.5, 214/1 B, 219/79, 235/151.11
[51] Int. Cl. ................................. B25j 9/00, G06f 15/46
[58] Field of Search .................... 340/172.5; 235/151.11; 214/1 B, 1 CM, 11; 209/72; 219/79, 124

[56] References Cited

UNITED STATES PATENTS

| | | | |
|---|---|---|---|
| 2,988,237 | 6/1961 | Devol, Jr. ............................. | 214/11 |
| 3,051,328 | 8/1962 | Brown et al. ........................ | 214/1 |
| 3,346,848 | 10/1967 | Viret et al. ......................... | 340/172.5 |
| 3,306,442 | 2/1967 | Devol ................................. | 209/121 |

Primary Examiner—Raulfe B. Zache
Attorney—Mason, Kolehmainen, Rathburn & Wyss

[57] ABSTRACT

Manipulator apparatus is provided wherein a number of multi-step programs for controlling movement of the manipulator arm in desired patterns of movement are available. Facilities are provided for automatically selecting any one of the programs in a random manner in respect to externally developed signals representing such programs. In a particular embodiment, the programs available control movement of the arm to perform different patterns of spot welding operations in accordance with automobile bodies randomly distributed on a production line conveyor. The control system also functions automatically to perform a spot welding operation at certain program steps in accordance with recorded spot weld control signals and without requiring a separate program step for a spot welding instruction, thereby substantially decreasing the number of program steps required to carry out a given pattern. Facilities are also provided for preventing double or multiple welds in response to a single position instruction or program step of the manipulator arm.

In accordance with a further embodiment, the manipulator apparatus is arranged to select different programs in a predetermined sequence but also responds to control signals indicating the presence or absence of certain external conditions associated with the programmed operations to skip one or more programs until the external conditions are changed.

18 Claims, 13 Drawing Figures

Patented April 4, 1972

INVENTORS:
MAURICE J. DUNNE
ROBERT E. CORRELL
JOSEPH ALBERT PICARD JR.

BY Mason, Kolehmainen
Rathburn & Wyss
ATTORNEYS

| FIG. 2 | FIG. 3 |

INVENTORS:
MAURICE J. DUNNE
ROBERT E. CORRELL
JOSEPH ALBERT PICARD JR.

BY *Mason, Kolehmainen, Rathburn & Wyss*
ATTORNEYS

Patented April 4, 1972
3,654,616
6 Sheets-Sheet 4
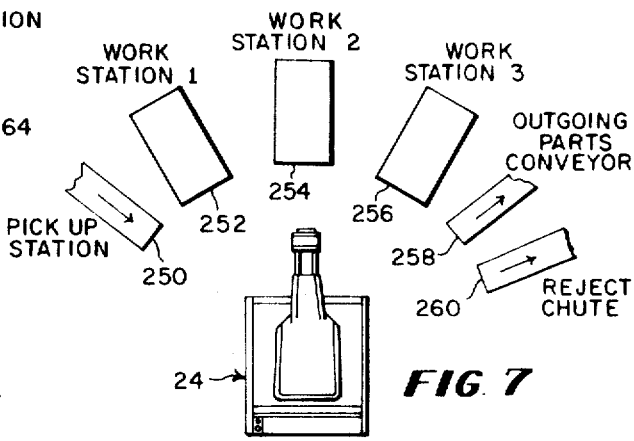
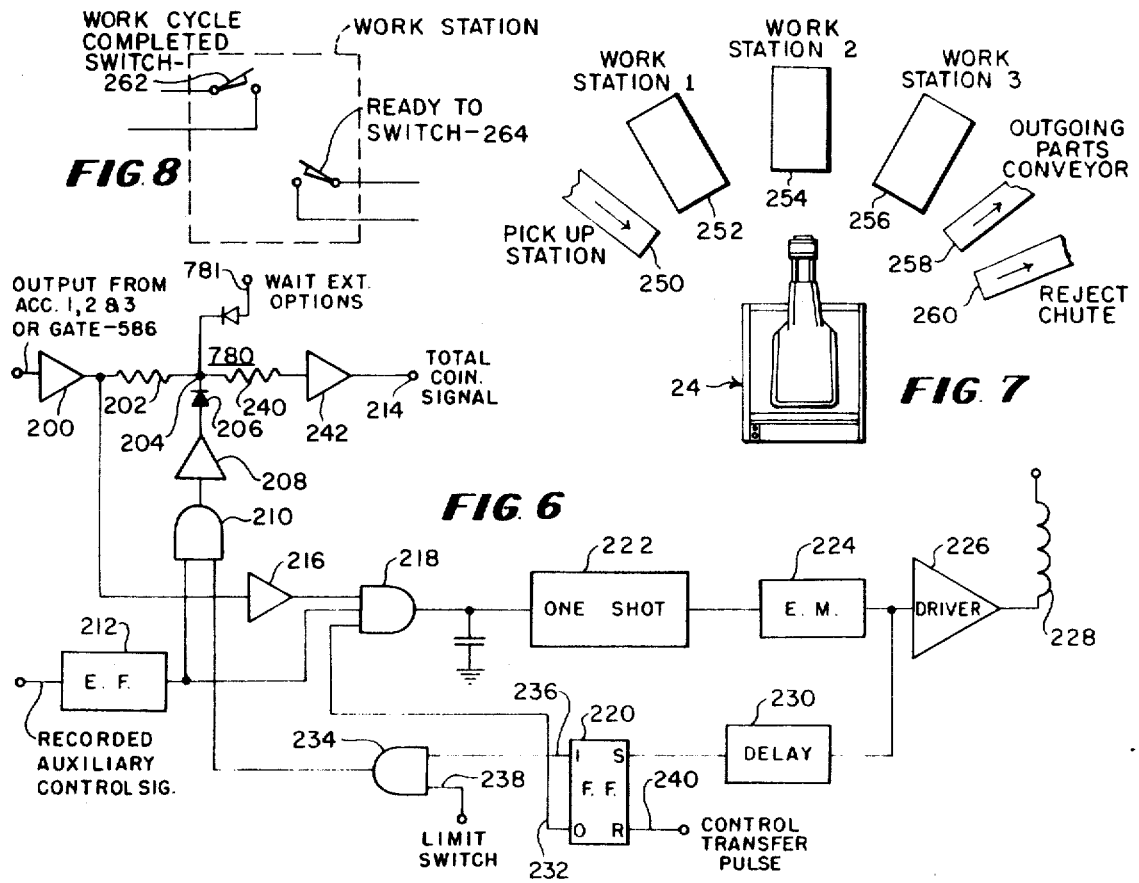
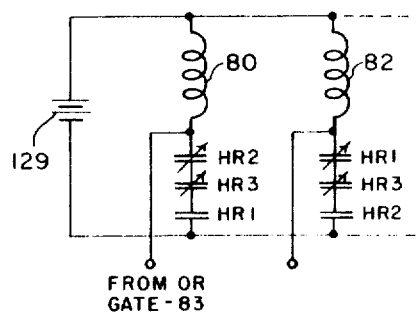
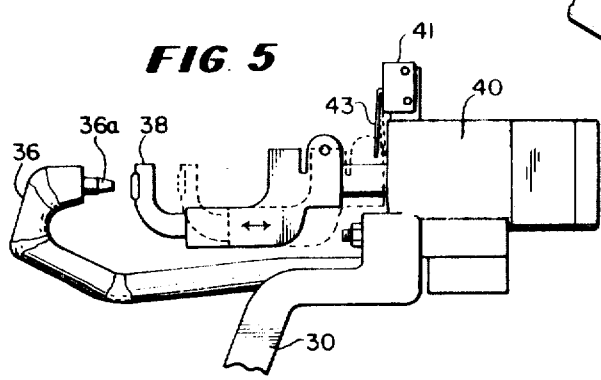
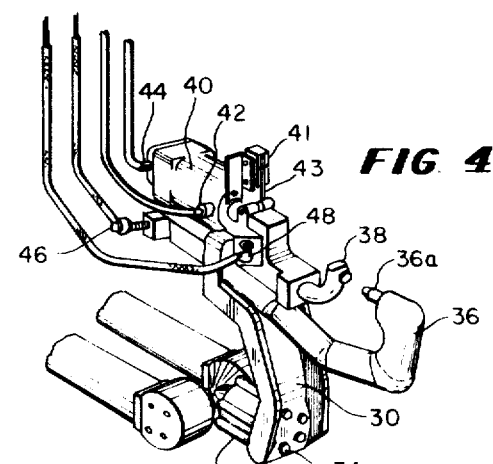
INVENTORS:
MAURICE J. DUNNE
ROBERT E. CORRELL
JOSEPH ALBERT PICARD JR.
BY Mason Kolehmainen
Rathburn & Wyss
ATTORNEYS

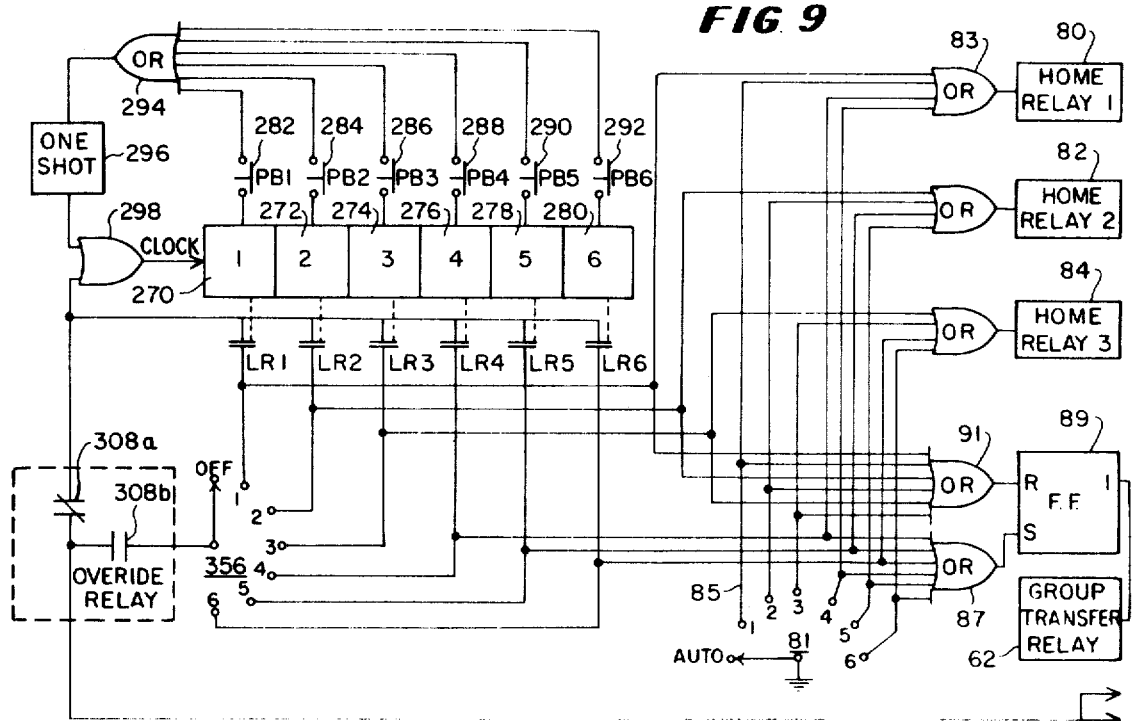
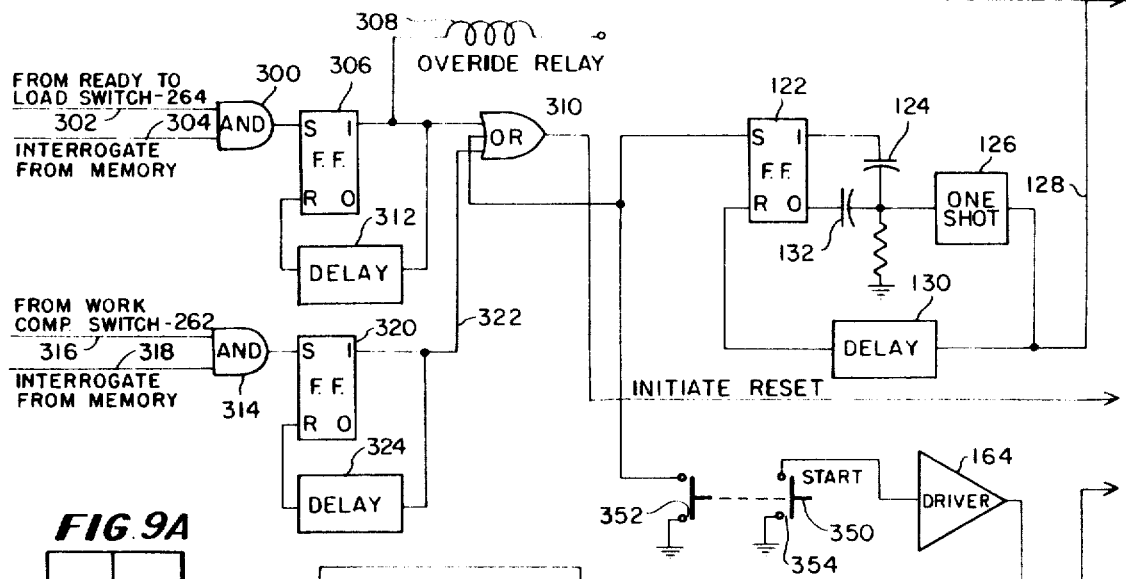
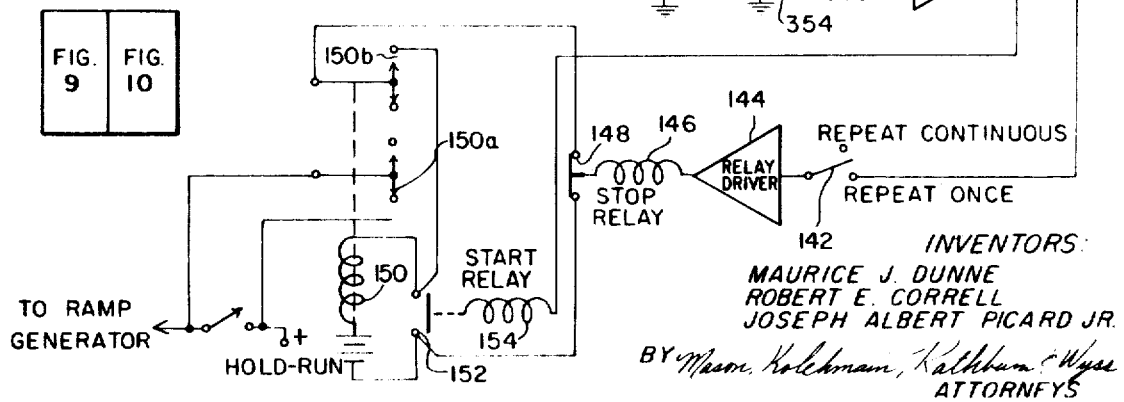
FIG. 9
FIG. 9A
INVENTORS:
MAURICE J. DUNNE
ROBERT E. CORRELL
JOSEPH ALBERT PICARD JR.
BY *Mason, Kolehmainen, Rathburn & Wyss*
ATTORNEYS

PROGRAM SELECTION ARRANGEMENT FOR MANIPULATOR APPARATUS

The present invention relates to manipulator apparatus, and more particularly to manipulator apparatus wherein a manipulator arm is programmed to carry out any one of a number of different series of program steps to perform different work operations.

Various types of manipulator apparatus have been provided in the past which are capable of being taught a series of program steps during a teaching mode of operation and of thereafter carrying out the program steps in repeated work cycles of the apparatus. One such arrangement is shown, for example, in Dunne, et al., application, Ser. No. 808,152 filed Mar. 18, 1969 and assigned to the same assignee as the present invention.

While such arrangements have in general been satisfactory for their intended purpose, as the work operations to be performed by the apparatus have become more complex, the need for different types of programs and the automatic selection of different programs in accordance with varying external conditions has become more urgent.

It is, therefore, a primary object of the present invention to provide a new and improved program selection arrangement whereby any one of a number of different programs, each consisting of a number of program steps, may be automatically selected in accordance with conditions external to the manipulator apparatus itself.

It is another object of the present invention to provide a new and improved program selection arrangement for manipulator apparatus wherein any one of a number of different multi-step programs may be selected in a random manner in accordance with externally produced signals.

It is a further object of the present invention to provide a new and improved control circuit for manipulator apparatus whereby the number of program steps required to carry out a desired series of movements of the manipulator arm together with the operation of certain auxiliary functions, is minimized.

It is a still further object of the present invention to provide a new and improved control circuit for a manipulator apparatus whereby the performance of an auxiliary function is delayed until after total coincidence has been achieved in response to a recorded program step, thereby minimizing the number of different program steps required to effect manipulator arm movement and performance of the auxiliary functions.

It is another object of the present invention to provide a new and improved control circuit for manipulator apparatus whereby a spot welding operation may be performed in association with different program steps while substantially decreasing the number of program steps which must be stored to accomplish a given spot welding program.

It is still another object of the present invention to provide a new and improved control circuit for manipulator apparatus wherein the making of double or multiple spot welds at a given position is avoided.

It is a still further object of the present invention to provide a new and improved program selection arrangement for manipulator apparatus wherein the manipulator arm is normally arranged to carry out a number of programs in a given sequence but in response to external conditions will skip one or more of said programs as long as said external conditions exist.

The invention, both as to its organization and method of operation, together with further objects and advantages thereof, will best be understood by reference to the following specification taken in connection with the accompanying drawings in which:

FIG. 1 is a perspective view of a car body spot welding conveyor arrangement embodying features of the present invention;

FIGS. 2 and 3, when placed in the manner shown in FIG. 2A, comprise a control circuit for the memory drum portion of the manipulator apparatus of FIG. 1;

FIG. 4 is a perspective view of the spot weld gun arrangement utilized in the manipulator apparatus of FIG. 1;

FIG. 5 is a side view of the arrangement shown in FIG. 4;

FIG. 5A is a schematic diagram of a relay holding circuit utilized in the arrangement shown in FIG. 2;

FIG. 6 is a circuit diagram of a control circuit utilized in the arrangement of FIGS. 2 and 3 to prevent double welds;

FIG. 7 is a diagrammatic view of an alternative program selection arrangement in accordance with the invention;

FIG. 8 is a diagrammatic view of the control switches provided in each of the work stations in FIG. 7; and FIGS. 9 and 10, when placed in the manner shown in FIG. 9A, comprise a control circuit employed in the manipulator apparatus of FIG. 7.

Figure 1:
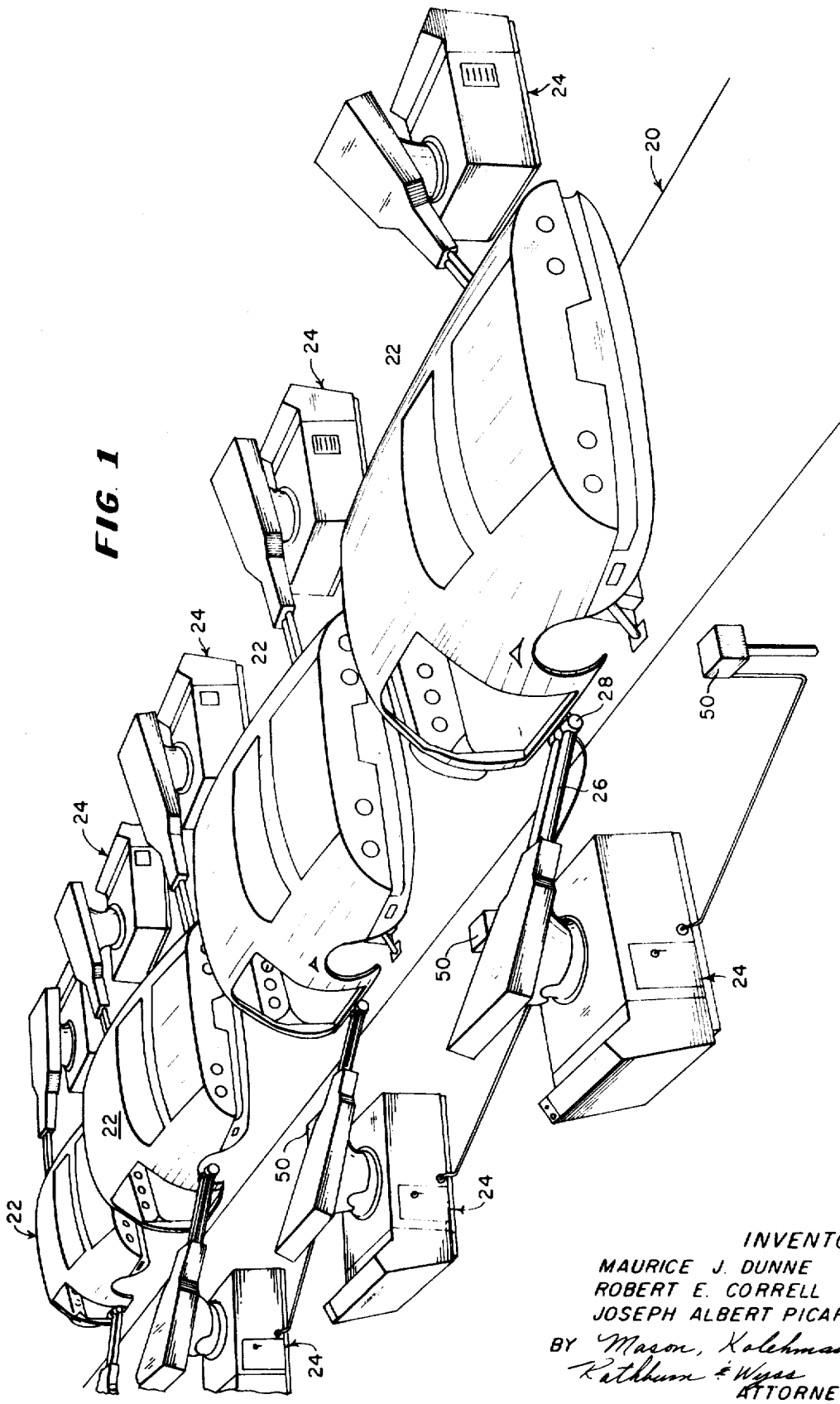

Referring now to the drawings, and more particularly to FIGS. 1 to 6, inclusive, thereof, the random program selection arrangement of the present invention is therein illustrated in connection with manipulator apparatus adapted to perform different spot welding patterns on the car frames of an automobile production line.

More particularly, a start-stop conveyor, indicated generally at 20, is provided on which a number of car bodies indicated generally at 22, are positioned so that they move past a series of spot welding stations at each one of which there is positioned a programmable manipulator apparatus indicated generally at 24. Each manipulator apparatus 24 may be of the type shown and described in Dunne, et al. application, Ser. No. 808,152 filed Mar. 18, 1969 and reference may be had to said application for a detailed description of such manipulator apparatus. However, for the purposes of the present invention it may be stated that each manipulator apparatus 24 includes an extendable boom portion indicated generally at 26 which is pivotally mounted for tilting movement about a horizontal axis and is also rotatably mounted for movement about a vertically extending axis. The boom 26 may thus be tilted to give an up and down motion of the outer end of the manipulator arm and the boom may be extended or retracted to give an in-out motion to the end of the arm. At the outer end of the boom 26 a crosshead assembly 28 is employed to provide a wrist bend motion about an axis transverse to the longitudinal in-out movement of the boom 26 and a wrist swivel action is given about an axis perpendicular to the wrist bend axis so that 5° of freedom are provided for the manipulator arm of the apparatus 24. All 5° of freedom are controlled by means of a memory drum arrangement described in detail in the above-identified copending Dunne, et al. application, a control system being provided whereby the manipulator arm may be taught a desired series of program steps during a program recording operation and may thereafter be moved through the recorded series of program steps any desired number of times during repeatable work cycles of the manipulator apparatus, all as described in detail in the above-identified copending Dunne, et al. application.

In the arrangement of the present invention, the manipulator arm carries a welding gun so that a spot welding operation may be performed on one of the car frames 22 positioned on the conveyor 20 in the vicinity of the manipulator apparatus. More particularly, as shown in FIGS. 4 and 5, the wrist swivel axis of the manipulator apparatus carries a bracket 30 which is secured to the wrist swivel output member 32 of the manipulator apparatus by means of the bolts 34 and carries a pair of welding electrodes 36 and 38. The welding electrode 36 is fixed to the bracket 30 and is provided with a reversely extending tip portion 36a which is adapted to engage the inner surface of the car frame when the manipulator arm is moved to the desired position. The welding electrode 38 is movable under the control of a pneumatically operated cylinder 40 the actuation of which is controlled by the application of air pressure to input and output conduits 42 and 44 by means of suitable flexible overhead air hoses. When the piston of the operating cylinder 40 is actuated to the forward position, the electrode 38 is moved into engagement with the opposite side of the car frame from the electrode tip 36a after which a pulse of spot welding current is applied to the electrodes 36, 38 through the electrode connectors 46 and 48 so that a spot welding operation is performed at the particular point on the car frame at which the manipulator arm has been positioned, this welding current being supplied through suitable flexible overhead cables to the connectors 46 and 48.

In accordance with an important feature of the present invention, a series of six different programs each consisting of a plurality of programmed steps, are provided in the memory storage unit of each manipulator apparatus 24. Each of these programs is arranged to position the manipulator arm of the corresponding manipulator apparatus to a series of positions corresponding to a desired pattern of spot welds on a car body of a particular type on the conveyor 20. Furthermore, the six different types of car frames or bodies may be randomly positioned on the conveyor 20 and facilities are provided in accordance with the present invention for automatically selecting the proper program for the manipulator arm of the apparatus adjacent to that particular car frame at a particular position of the conveyor 20. To accomplish this, a body style sensing device indicated generally at 50 is provided somewhat ahead of each manipulator apparatus 24 and is arranged to sense the particular type of car body which is being presented to the associated manipulator apparatus for a particular spot welding operation. Each of the sensing devices 50 may be actuated in any desired manner by means of dogs or other suitable actuators which are positioned on the conveyor 20 and move therewith, these dogs being initially set to a desired position corresponding to a particular type of car body when the car body is initially deposited on the conveyor 20, as will be readily understood by those skilled in the art.

In this connection it will be understood that while the random program selection arrangement of the present invention is illustrated in conjunction with a car body welding operation, this control system may be used in connection with any other type of manipulative operation wherein different types of objects requiring different patterns of motion of the manipulator arm are randomly presented to the manipulator apparatus and are arranged to actuate a sensing device, such as the device 50, in accordance with such random distribution. It will also be understood that in the arrangement shown in FIG. 1, each manipulator apparatus 24 performs a different spot welding operation on each type of car body so that when the car body has been moved the length of the manipulator apparatus line, the complete car frame has been welded in accordance with the different spot welding programs selected in each manipulator apparatus 24.

Figures 2, 2A:
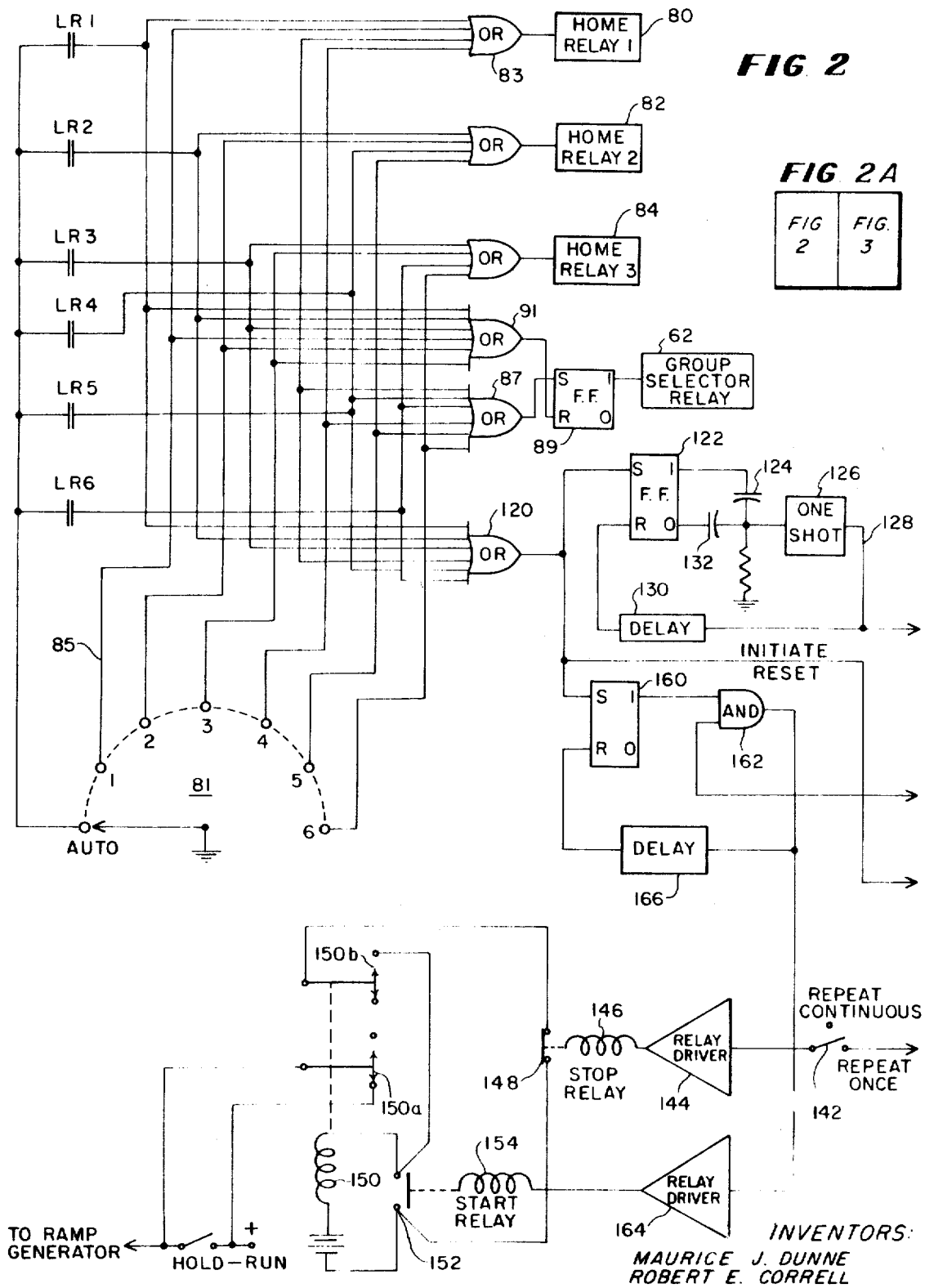
Figure 3:
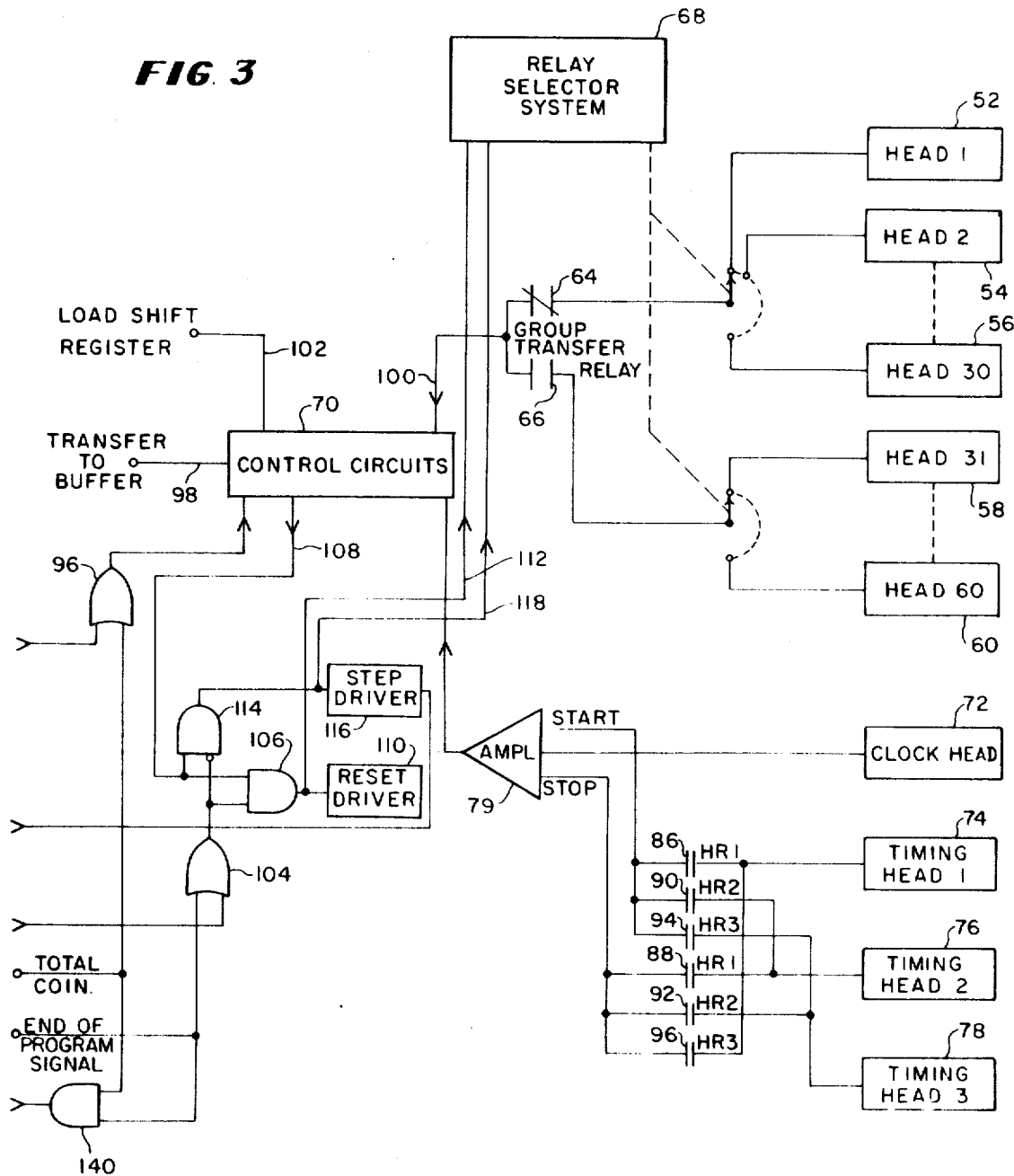

Considering now the electronic circuitry whereby random program selection of a desired program is made in accordance with signals from the sensing device 50, and referring to FIGS. 2 and 3 of the drawings, the sensing device 50 comprises a series of six relays, the individual contacts of which are indicated in FIG. 2 as the relay contacts LR-1, LR-2, to LR-6, inclusive. The relay contacts LR-1, etc. are normally open but are closed momentarily in response to actuator dogs, or the like, on the conveyor 20 as the car body is moved past the sensing station 50 to its rest position in the vicinity of the manipulator apparatus 24. Thus, if the car body is of the first type, the relay contacts LR-1 are closed for a brief interval of time to permit selection of the desired one of the six programs in the memory drum arrangement of the manipulator apparatus of the control system. In this connection it is pointed out that the control system of the manipulator apparatus 24 is shown and described in detail in the above-identified copending Dunne, et al. application, and reference may be had to this application for a detailed description of this control system. However, in FIGS. 2 and 3, certain portions of the memory drum and control circuits are shown to facilitate an understanding of the random program selection facilities of the present invention.

In the illustrated embodiment, the memory drum is provided with a series of 60 read-write heads, these heads being divided into two groups of 30 heads each. Thus, head 52 is the first head in the first group, head 54 is the second head in this first group and the head 56 is the thirtieth head in the first group. The head 58 is the first head in the second group, and the head 60 is the last head in the second group of 30 read-write heads.

Selection of either group of 30 read-write heads is made by means of a group transfer relay 62 which is provided with a first set of normally closed contacts 64 and a second set of normally open contacts 66. A two-bank selector switch arrangement is driven from a relay selector system indicated generally at 68 so that the first head in either of the two 30-head groups is connected to the control circuits 70 depending upon the position of the group transfer relay 62. A clock head 72 is also positioned adjacent the memory drum and is arranged to sense clock pulses which are recorded on the memory drum and control the sensing of 80 bits of information recorded along one-third of the periphery of the memory drum. Three such 80-bit groups are recorded around the circumference of the drum so that six different programs may be selected by actuation of the group transfer relay 62 and one of three timing heads 74, 76 and 78 which detect the end points of program intervals defined by word tracks which are permanently recorded in the memory drum and occur once each revolution at the desired staggered intervals to define three program intervals of 80 bits each.

In order to define these three program intervals, the pulses from the timing heads 74, 76 and 78 are supplied through contacts of three home relays 80, 82 and 84, to provide the start and stop pulses for each program interval. Thus, when the home relay 80 is energized, the contacts 86 thereof are closed to provide a start pulse from the timing head 74 and the contacts 88 thereof are closed to provide a stop pulse from the timing head 76. In a similar manner when the home relay 82 is energized, the contacts 90 and 92 thereof are closed to provide start and stop pulses from the timing heads 76 and 78, respectively. In a similar manner when the relay 84 is energized the contacts 94 and 96 thereof are closed so as to provide a start pulse from the timing head 74.

When the relay contacts LR-1 are closed in the sensing device 50, coincident with movement of a car frame of the first type past the sensing station 50, a ground pulse is supplied through the selector arm of a selector switch 81 and through a four-input OR-gate 83 to the home relay 80 so that this relay is energized to select the first program interval. However, in the illustrated embodiment the group selector relay 62 remains de-energized for the first three programs so that the contacts 64 thereof are closed and supply pulses from the first group of 30 heads to the control circuits 70. As a result a 30-step program is made available to the shift register and buffer storage registers associated with the control circuits 70, as described in more detail in the above-identified Dunne, et al. application. This same first program may also be selected manually by actuating the selector switch 81 to the first manual position in which position a ground pulse is supplied over the conductor 85 to another input of the OR-gate 83. In a similar manner when the relay contacts LR-2 or LR-3 are closed in the sensing device 50, the home relays 82 or 84 are energized to select the second and third program intervals which may be detected by the first group of read-write heads.

When the relay contacts LR-4 are closed indicating the fourth type of car body has been moved adjacent the manipulator apparatus, a ground pulse is supplied through the contacts LR-4 to another input of the OR-gate 83 so that the home relay 80 is energized. This ground pulse is also supplied through one input of a six-input OR-gate 87 to the set terminal of a flip-flop circuit 89 which energizes the group transfer relay 62 so that the contacts 64 thereof are opened and the contacts 66 thereof are closed. As a result, the second group of 30 read-write heads are now supplied to the control circuits 70. When the relay contacts LR-5 or LR-6 are closed, the corresponding home relays 82 or 84 are energized and the group selector relay 62 is also energized through the flip-flop 89 in each position so that the second group of 30 heads is available for reading out a 30-step program from the memory drum. Each of the other five programs may likewise be manually selected by actuation of the selector switch 81 to the second through sixth positions. Since the group transfer relay 62 should be de-energized for the first three programs, another six input OR-gate 91 is provided which operates in response to a ground applied through LR-1, LR-2 or LR-3, or a ground applied in the first three manual positions of the switch 81, to reset the flip-flop 89 so that the relay 62 is de-energized and the contacts 64 thereof are closed and the contacts 66 opened.

When one of the six programs is selected by actuation of one of the sets of relay contacts LR-1 to LR-6, the start-stop pulses and clock pulses are supplied to an amplifier 94 which selects only those clock pulses appearing between the selected start and stop pulses and supplies them to the control circuits 70 where they are employed as shift pulses to control an 80-bit shift register (not shown) which acts as a temporary storage for the first step of a given program. This 80-bit shift register includes sufficient storage for the encoders associated with all five axes of the manipulator apparatus as well as storage for certain auxiliary functions which are taught during the teaching mode of the manipulator apparatus so that certain auxiliary functions will be performed automatically during the repeat mode of operation, as described in detail in the above-identified Dunne, et al. application. One of these auxiliary functions may be a recording at the position of the last program step to indicate the end of a particular program, this bit being referred to as an end-of-program signal. In addition, if certain auxiliary operations are to be performed at a particular step of the program, as for example, when a spot welding operation is to be performed a number of times at many different positions of the manipulator arm, an auxiliary control signal is recorded during the teaching operation so that this auxiliary function will be performed automatically at each step at which such control signal is recorded. In accordance with the present invention, the operation of this auxiliary function is delayed until the manipulator arm has been moved to the desired position and a total coincidence signal indicating completion of such movement is obtained, as will be described in more detail hereinafter.

Considering now the operation of the control circuits 70 and assuming that the first program has previously been selected, the first step of this program has been stored in a buffer storage register (not shown) and the second program step of the first program has been stored in the 80-bit shift register referred to previously, the first program step in the buffer storage register operates as a command signal to initiate movement of the manipulator arm to the desired position indicated by the recorded coordinates of the first program step. As soon as this motion has taken place a total coincidence signal is produced, as described in more detail in said above-identified Dunne, et al. application, and this total coincidence signal is supplied through an OR-gate 96 to the control circuits 70. These control circuits respond by operating a parallel transfer circuit (not shown) over the conductor 98 so that the second program step in the shift register is transferred on a parallel basis to the buffer storage register, as described in more detail in said Dunne, et al. application. At the same time a step driver pulse approximately 100 milliseconds in length is developed on the conductor 108 and is supplied through a step driver AND-gate 114 to the step driver 116 and the relay selector system 68. In response to this step driver pulse the relay selector system 68 is shifted to the third read-write head and after the step driver pulse is over the third program step is then loaded into the shift register through the contacts 64, the control circuits 70 and over the conductor 102. When total coincidence is achieved in all five axes for the position indicated by the second program step, a total coincidence signal is supplied through the OR-gate 96 to the control circuits 70 which respond in the same manner by transferring the third program step from the shift register to the buffer storage register, stepping the relay selector system 68 to the next read-write head and then loading the sensed information into the shift register. It will thus be seen that the steps of transferring a given program step from the shift register to the buffer storage register, then stepping to the next read-write head and then loading the information sensed by this head into the shift register are accomplished automatically in the control circuits 70 in response to a total coincidence signal supplied to the OR-gate 96.

When a total coincidence signal is produced at the end of the movement corresponding to the next to last step of a given program, the last step of this program is transferred from the shift register to the buffer storage register and this last step of the program includes an end-of-program signal which was recorded at that step during the teaching mode of the apparatus. Accordingly, as soon as the last step of the program is transferred to the buffer storage register, an end-of-program signal is produced which is supplied to one input of a two-input OR-gate 104 and passes to the reset AND-gate 114 to block the same and is also applied to one input of a reset AND-gate 106. Also, the control circuits 70 function to supply the above-described step driver pulse over the conductor 108 to the other input of the reset AND-gate 106 in response to each total coincidence signal transmitted through the OR-gate 96. As stated heretofore, the pulse on the conductor 108 has a duration of approximately 100 milliseconds so that it persists after the total coincidence signal disappears when the last program step is transferred to the buffer storage register and hence coincides with the end-of-program signal accompanying the last program step. Accordingly, the AND-gate 106 is enabled as soon as the last program step is transferred to the buffer storage register and the output of the AND-gate 106 is supplied to the reset driver 110 so as to reset the electromechanical counter of the manipulator apparatus which indicates the particular step of a given program to which the manipulator arm is being moved. Such an electromechanical counter with its associated reset driver and step driver, is described in a copending application of Maurice J. Dunne and George E. Munson, Jr., Ser. No. 10,379 filed Feb. 11, 1970 and reference may be had to said copending application for a detailed description of such an arrangement.

At the same time that the reset driver 110 is actuated, a pulse is supplied over the conductor 112 to the relay selector system 68 so as to reset the selector switches back to the first head, i.e., head 52 or head 58, depending upon which group of read-write heads, is being utilized. After the step driver pulse on the conductor 108 disappears, the information sensed by the first head is transferred by way of the control circuits 70 and the conductor 102 into the shift register, while the manipulator arm is being moved to the position indicated by the last step of the program which is stored in the buffer storage register.

When the manipulator arm has been moved to the position indicated by the last program step a total coincidence signal is produced and supplied through the OR-gate 96 to the control circuits 70 and these circuits respond by transferring the first step of the old program from the shift register to the buffer storage register. As soon as this occurs the total coincidence signal and end-of-program signal both disappear. However, the step driver pulse on the conductor 108 persists after this transfer takes place and as soon as the first program step is transferred to the buffer storage register and the end-of-program signal disappears, the OR-gate 104 no longer inhibits the input of the AND-gate 114 and an output is produced by the AND-gate 114 which is supplied to the step driver 116 so that the electromechanical counter is stepped from the zero position to position 1, thus indicating that the manipulator arm is being moved to the position indicated by step 1 of the program being repeated. At the same time, a pulse is supplied by way of the conductor 118 to the relay selector system 68 so that the second head 54 is selected and after the step driver pulse is over information from head 54 is loaded into the shift register by way of the control circuits 70.

It will thus be seen that the control circuits 70 normally function in response to an end-of-program signal by loading step 1 of the old program into the shift register as the manipulator arm starts to move in accordance with the last step of the program and then function to shift step 1 of the old program into the buffer storage and load step 2 into the shift register at the end of the last program step. Such operations are entirely satisfactory when a particular program is to be repeated a number of times. However, when a number of different programs are to be randomly selected, the transfer of steps 1 and 2 of the old program into the buffer and shift registers will not be satisfactory since an entirely different program may be selected at random depending upon closure of one of the sets of relay contacts LR-1 to LR-6.

In accordance with the arrangement of the present invention, the control circuits 70 continue to load steps 1 and 2 of the old program into the buffer and shift registers during the last step of a given program. However, in response to closure of one of the sets of relay contacts LR-1 to LR-6, an initiate reset signal is developed together with two sequentially developed, artificial, total coincidence signals which causes the control circuits 70 to function to store steps 1 and 2 of the randomly selected new program in the buffer and shift registers, respectively. More particularly, when any one of the relay contacts LR-1 to LR-6 is closed, an initiate reset signal is supplied to a six-input OR-gate 120 the output of which is supplied as the second input of the OR-gate 104. At the same time, the output of the OR-gate 120 is supplied to a flip-flop circuit 122 so that this flip-flop circuit is set and produces an output which is transmitted through a capacitor 124 to a one-shot multivibrator 126 so that an output pulse is produced on the output conductor 128 which is supplied to the other input of the two-input OR-gate 96 and is transmitted to the control circuits 70. The pulse thus developed on the conductor 128 acts as an artificial total coincidence signal and the control circuits 70 respond thereto by producing a step driver pulse on the conductor 108 in the same manner as if a normal total coincidence signal has been produced. Since the above-described initiate reset signal is also being transmitted through the OR-gate 104, the reset AND-gate 106 is enabled, the reset driver 110 is energized, the electromechanical counter is reset to zero, and the relay selector system 68 sets its controlled selector switches to the first head position.

However, since closure of the relay contacts LR-1 selects a new program, as described in detail heretofore, step 1 of the new program is now loaded into the shift register at the end of the step driver pulse on the conductor 108.

The relay contacts, such as the contacts LR-1, are closed for only a brief interval of time when the sensing device 50 is actuated as a new car frame is moved to a position adjacent the manipulator apparatus. Accordingly, the contacts LR-1 are opened shortly after closure thereof in response to the sensing device 50, but the home relays 80, 82, and 84 are interconnected in the manner shown in FIG. 5A so that they maintain their settings after the contacts LR-1 are opened and are reset only when a different home relay is selected. Referring to this figure, the home relay 80 is energized from the battery 129 when a ground signal is developed by the OR-gate 83. The contacts HR-1 thereof are then closed to constitute a holding circuit for the relay 80 through the series connected normally closed contacts of the other home relays HR-2 and HR-3. The relay 80 will remain energized until either the relay 82 or the relay 84 is energized by closure of LR-2 or LR-3. When this occurs one of the contacts HR-2 or HR-3 will be opened so that the holding circuit for the relay 80 is broken.

The group selector relay setting also remains in the position determined by closure of the relay contacts LR-1, for example, so that the selected program is available for the duration of the desired spot welding operation even though the contacts LR-1 are closed only momentarily. However, it is also necessary to develop a second artificial total coincidence signal so that the control circuits 70 may respond thereto by transferring step 1 of the newly selected program into the buffer storage register, step the relay selector 68 to position 2 and then load step 2 of this new program into the shift register.

This is accomplished by providing a delay circuit 130 which is connected from the conductor 128 to the reset terminal of the flip-flop circuit 122. The delay circuit 130 delays resetting of the flip-flop 122 until after the relay contacts LR-1 for example have been reopened and when the flip-flop 122 is reset to its initial condition a pulse is transmitted through the capacitor 132 to the one-shot multivibrator 126 so that a second pulse appears on the conductor 128 and is transmitted through the OR-gate 96 to the control circuits 70. This second artificial total coincidence signal is effective to transfer step 1 of the new program into the buffer storage register and at the same time a pulse is produced on the conductor 108. Since the initiate reset signal from the OR-gate 120 has now disappeared, the AND-gate 114 is no longer inhibited and an output from the AND-gate 114 is supplied to the step driver 116 and the relay selector system 68 so that step 2 of the new program is selected by the relay selector 68 and is loaded into the shift register.

While the above-described random program selection facilities are effective to remove steps 1 and 2 of the old program from the buffer and shift registers and substitute steps 1 and 2 of the new program, it is also necessary that the manipulator apparatus be stopped at the end of the old program so that it will not respond to information supplied to the buffer storage register until both steps 1 and 2 of the new program have been loaded into the buffer and shift registers, respectively. To this end, the total coincidence signal supplied to the OR-gate 96 at the end of each program step and the end-of-program signal developed during the last program step are both supplied as two inputs to a two-input AND-gate 140 the output of which is supplied through a selector switch 142 to a relay driver circuit 144 which actuates a stop relay 146. The stop relay 146 controls the normally closed contacts 148 which constitute a holding circuit for a relay 150 which is employed to control starting of the manipulator apparatus, as described in more detail in the above-identified copending Dunne, et al. application, Ser. No. 808,152. More particularly, the relay 150 controls the normally closed contacts 150a thereof and the normally open contacts 150b thereof and is in turn controlled by the normally open contacts 152 of a start relay 154. Assuming that the relay 150 is energized, the contacts 150b thereof are closed and the contacts 150a thereof are opened. However, when the stop relay 146 is energized, the contacts 148 thereof are opened so that the holding circuit for the relay 150 is removed and the contacts 150a thereof are closed. When this occurs a positive voltage is supplied through the contacts 150a to a ramp generator which responds to this positive voltage by developing a ground potential on its output conductor which is supplied in parallel to the input terminals of all of the servo amplifiers in each of the five controlled axes of the manipulator apparatus, as described in more detail in the above-identified copending Dunne, et al. application, Ser. No. 808,152. Accordingly, as soon as the contacts 150a are closed in response to actuation of the stop relay 146, the inputs of all five servo amplifiers are grounded so that no movement of the manipulator arm is thereafter possible. Accordingly, during the period of time when steps 1 and 2 of the old program are being removed from the buffer and shift registers and steps 1 and 2 of the new program are being loaded into these registers, the manipulator arm is held motionless.

In accordance with a further feature of the present invention, facilities are provided for energizing the start relay 154 after the step driver 116 has been actuated and while the second step of the new program is being loaded into the shift register. More particularly, the output of the OR-gate 120 is supplied to the set terminal of a flip-flop circuit 160 so as to produce an output which is supplied to one input of an AND-gate 162. The other input of the AND-gate 162 is supplied from the output of the step driver 116. As described heretofore, the AND-gate 114 does not develop an output until step 1 of the new program has been transferred to the buffer storage register and a second step driver pulse is produced on the conductor 108. However, as soon as the step driver 116 is actuated, the AND-gate 162 develops an output signal which is supplied through a relay driver 164 to the start relay 154 so that the contacts 152 thereof are closed, the relay 150 is energized and the molding contacts 150b thereof are closed so as to provide a holding circuit through the contacts 150b and the contacts 148 of the de-energized stop relay 146. The manipulator apparatus is then conditioned to respond to the first program step of the newly selected program by moving the manipulator on to the position indicated by this program step and continues to carry out the selected program of spot weld positions. The output of the AND-gate 162 is also supplied through a suitable delay circuit 166 to the reset terminal of the flip-flop 160 so that this flip-flop is reset at the end of the pulse output of the AND-gate 162.

In the event that it is desired to have the manipulator apparatus repeat continuously one of the randomly selected programs, the selector switch 142 may be opened so that no pulse is applied to the relay driver 144 upon the occurrence of a total coincidence signal and an end-of-program signal. When this occurs the stop relay 146 is not energized and the previously selected program will continue to be repeated until another set of relay contacts LR–1 to LR–6, inclusive, is closed. Also, as described generally heretofore any one of the six different programs may be manually selected by actuation of the selector switch 81 to one of the six indicated manual positions and the above described random program selection facilities will respond to actuation of the grounded arm of the selector switch 81 to that position in the same manner as if one of the relay contacts LR–1 to LR–6, inclusive, were actuated by the sensing device 50.

In situations where an auxiliary function is to be performed after the manipulator arm has been moved to the desired position, as, for example, in the described spot welding operation wherein a spot weld is to be performed after the manipulator arm has been moved to each spot welding position, it is possible to program movement of the manipulator arm to the desired position and then repeat the program step position along with a control signal which is used to initiate the auxiliary function, such as a spot welding operation. However, such an arrangement has the disadvantage that a large number of program steps are required, particularly if the auxiliary function is to be repeated at many different steps of the program as in spot welding. On the other hand, if the auxiliary control signal is recorded along with the program step the auxiliary control signal will be sensed at the beginning of the step and before the manipulator arm has been moved to the desired position. In accordance with a further feature of the present invention, facilities are provided for delaying initiation of the auxiliary function until after the manipulator arm has been moved to the desired position and a total coincidence signal produced. The auxiliary control signal may then be recorded along with the program step so that a large saving in the total number of program steps is achieved. In this connection will be understood that the auxiliary function which is delayed may comprise any type of auxiliary operation, although in the illustrated embodiment a spot welding operation is performed.

Referring to FIG. 6 wherein the circuitry to perform this additional function is shown, it is assumed that an output is derived from an accuracy 1, 2 and 3 OR-gate similar to the OR-gate identified as 586 in FIG. 12 of the above-identified Dunne, et al. application, Ser. No. 808,152. As described in said Dunne, et al. application, the output of this OR-gate is combined in a subsequent AND-gate with signals derived from external apparatus, such as a wait external signal, or other options, and the output of this AND-gate acts as a total coincidence signal which is supplied to the control circuits 70 in the manner described in detail hereinabove. However, in the arrangement of FIG. 6 the total coincidence signal is inhibited until the auxiliary spot welding function has been performed. More particularly, the output from the accuracy 1, 2 and 3 OR-gate 586 is supplied through an amplifier 200 and a resistor 202 to the junction 204 which corresponds to the AND-gate 780 of the above-identified Dunne, et al. application to which other signals such as the wait external signal and option signals are supplied from the conductor 781. The junction 204 is normally held at ground by means of a diode 206, which effectively forms another input for the AND-gate 780, the diode 206 being supplied from the output of an amplifier 208 which is in turn supplied from an AND-gate 210. One input of the AND-gate 210 is supplied from the recorded auxiliary control signal on the memory drum which is recorded at those program steps at which an auxiliary function, such as a spot welding operation, is to be performed, this signal being one of the 80 bits of information sensed by one of the read-write heads, as described in more detail in the above-identified copending Dunne, et al. application, Ser. No. 808,152. The sensed auxiliary control signal is supplied through an emitter follower 212 to one input of the AND-gate 210. However, this AND-gate is not enabled until spot welding operation has been completed. Accordingly, even though the auxiliary control signal is sensed at the beginning of the program step and before the manipulator arm has been moved to the desired position, the AND-gate is disabled and the diode 206 holds the junction 204 at ground and prevents the development of a total coincidence signal at the terminal 214.

When the manipulator arm has been moved to desired position, an output is derived from the OR-gate 586 and is supplied through the amplifier 200 and a second amplifier 216 to one input of a three-input AND-gate 218 to a second input of which the output of the emitter follower 212 is applied. The third input of the AND-gate 218 is connected to the O-terminal of a flip-flop circuit 220 so that this input is normally enabled. Accordingly, on program steps which include an auxiliary control signal, as soon as a total coincidence signal is derived from the OR-gate 586 and is supplied through the amplifier 216 to the AND-gate 218, an output is derived from the AND-gate 218 which is supplied to a one-shot multivibrator 222 and triggers or fires this multivibrator to produce a pulse of the proper width necessary to function with the associated spot weld gun equipment. This multivibrator pulse is supplied through an emitter follower 224 to a driver circuit 226 which is employed to actuate a start relay 228 which controls the weld gun equipment so that the operating cylinder 40 is actuated to bring the electrode 38 into engagement with the car body and a welding pulse is then applied to electrodes 46, 48 to perform the spot weld. The flip-flop 220 is controlled through a delay circuit 230 from the output of the emitter follower 224 so that the trailing edge of the one-shot multivibrator pulse developed by the multivibrator 222 is employed to set the flip-flop 220. As soon as the flip-flop 220 is set, the normally enabling output at its terminal 232 disappears so that the AND-gate 218 is thereafter disabled. By disabling the AND-gate 218 as soon as the spot weld is completed, double or multiple spot welds at the same position of the manipulator arm are positively avoided. However, such double welds could be produced if the AND-gate 218 were not disabled due to the fact that the manipulator arm might move slightly as the weld is being made so as to remove the total coincidence signal from the OR-gate 586. The manipulator arm control apparatus would thereafter reposition the manipulator arm back to the same position and another total coincidence signal would be produced by the OR-gate 586 which would then be transmitted through the AND-gate 218 and cause another weld at the same position. By disabling the AND-gate 218 as soon as the first spot weld is made, such undesired double weld conditions are avoided.

In the illustrated spot welding arrangement, it is desirable not only to delay the production of the total coincidence signal until the spot weld has been made but it is also necessary to delay the production of this signal until the movable electrode 38 has been moved back away from the body frame since the manipulator arm will start to move in the next position as soon as such a total coincidence signal is supplied to the control circuit 70, as described in detail hereinbefore. To accomplish this further delay, an AND-gate 234 is provided to one input of which is supplied an output from the terminal 236 of the flip-flop 220. The other input of the AND-gate 234 is supplied from the limit switch 41 associated with the movable electrode 38. The limit switch 41 is closed by actuation of the lever 43 when the electrode 38 is retracted to the dotted line position shown in FIG. 5 and the switch 41 is opened when the electrode 38 is moved against the car frame body and while the spot weld is being made. The limit switch 41 is again closed when the electrode 38 has been retracted after the spot weld has been completed. Since the flip-flop 220 is not set until the end of the start pulse developed by the one-shot multivibrator 222, there is no input applied to the input conductor 236 of the AND-gate 234 during the initial positioning of the manipulator arm or while the electrode 38 is being moved forwardly into engagement with the car frame. However, when the spot weld has been made and the electrode 38 has been retracted again, the limit switch 41 is closed so as to provide a second input on the conductor 238 so that the AND-gate 234 is enabled. The output of the AND-gate 234 is supplied to the other input of the AND-gate 210 and enables the AND-gate 210 so that the diode 206 is rendered non-conductive and the total coincidence signal which has previously been produced by the OR-gate 586, as described heretofore, is then transmitted through the resistor 240 and an amplifier 242 to the output terminal 214 where it constitutes the total coincidence signal which is supplied through the OR-gate 96 to the control circuits 70 (FIG. 3).

In FIGS. 7 to 10 of the drawings, an alternative embodiment of the invention is shown wherein different programs are arranged to be selected in a predetermined but variable sequence. However, depending upon conditions external to the manipulator apparatus the control facilities are arranged so that the apparatus will skip one or more programs in the sequence if certain external conditions are not present. Specifically, in the embodiment shown generally in FIGS. 7 and 8, the manipulator apparatus 24 is arranged to operate in conjunction with a pickup station 250, first, second and third work stations 252, 254 and 256, respectively, an outgoing parts conveyor 258, and a reject chute 260. In this embodiment the manipulator apparatus 24 is programmed to sequentially unload each of the work stations 252, 254 and 256 and place the completed part obtained from each work station on the outgoing parts conveyor 258. The manipulator apparatus is then programmed to take an incoming part from the pickup station 250 and reload the same work station. After doing this the manipulator apparatus moves to the next work station, removes the completed part and deposits it on the outgoing parts conveyor 258, takes a new part from the pickup station 250 and replaces it in this next work station. This sequential operation continues unless certain conditions are not present at any particular work station, in which case the manipulator apparatus skips that work station and goes on to the next one in the sequence. Specifically, each of the work stations 252, 254, and 256 is provided with a first switch 262 (FIG. 8) which is closed during the work cycle at that particular work station and is opened only after the work cycle has been completed. The switch 262 may be actuated in any suitable manner in accordance with the particular operation being performed at the work station, insofar as the present invention is concerned. Each work station also includes a switch 264 which is opened only if that work station is ready to receive a part, the switch 264 being closed, either manually because of tool changes at the work station or automatically in response to malfunctioning of the work station apparatus. If the manipulator apparatus comes to a work station to unload it and the work cycle completed switch 262 is not open, because the work cycle is still going on, the manipulator apparatus skips that station and goes on to the next one of the sequence. On the other hand, if the manipulator apparatus picks up an incoming part at the station 250 and attempts to bring it to a particular station to load it, if the ready to load switch 264 at that station is not open, because the work station is incapable of operation due to tool changes or the like, the manipulator apparatus then proceeds to dispose of the part in the reject chute 260 and proceeds to the next work station for unloading and reloading.

Each of the three programs for operation of the manipulator apparatus in association with each of the three work stations 252, 254 and 256 consists of two portions. The first program portion commands the manipulator arm to go to work station 252, for example, check the condition of the work cycle completed switch 262 at that work station, unload work station 252 and place the part on the outgoing conveyor 258. The second portion of the program for work station 252 commands the manipulator arm to go to the pickup station 250, return to work station 252 with the part, check the condition of the ready to load switch 264 at that work station and load the part into work station 252. The second and third programs are the same as the first program except that the commands are with respect to work stations 254 and 256, respectively.

Since six different programs are available from the primary drum storage arrangement of the control system described in detail heretofore in connection with the embodiment of FIGS. 1 to 6 are available, two more work stations could be serviced by one manipulator apparatus, making a total of five work stations with which one manipulator apparatus can function, although in the illustrated embodiment in FIGS. 7 to 10, only three work stations are shown. The sixth program is available for all of the work stations and commands the manipulator arm to carry the part to the reject chute 260 and then return to a neutral position. It is assumed that this program is taught as program No. 6.

Figure 10:
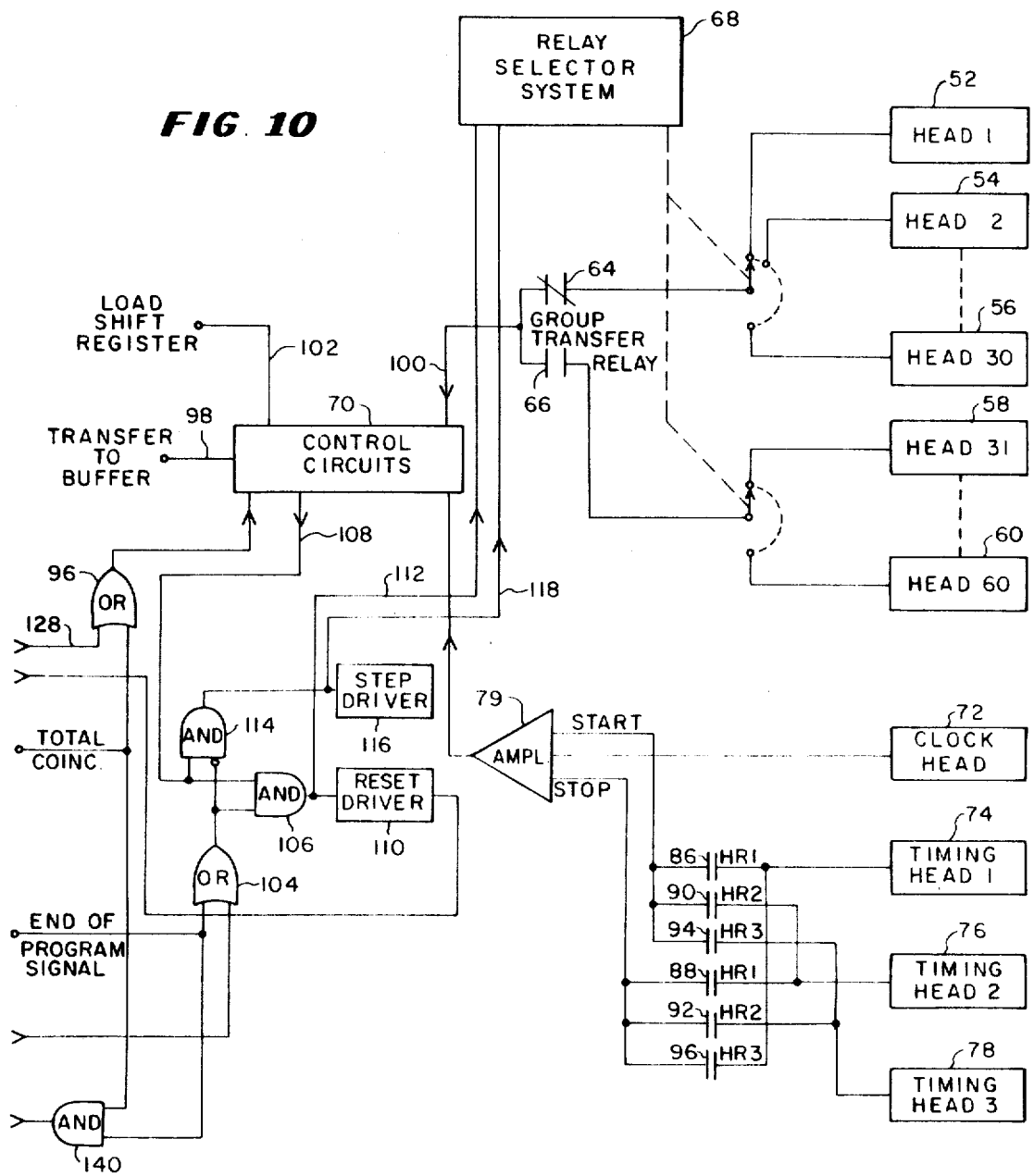

Referring now to FIGS. 9 and 10 wherein the control facilities for accomplishing the above-described sequential skip type of operation for the manipulator apparatus 24, it is pointed out that certain portions of the control system shown in FIGS. 9 and 10 are identical to the control system of FIGS. 2 and 3 and the same reference numerals have been given to corresponding components of these two systems. However, in the sequential skip system of FIGS. 9 and 10, a six-stage ring counter is provided, this counter comprising the stages 270, 272, 274, 278 and 280. Each of these ring counter stages is interconnected in a conventional manner so that the ring counter is stepped sequentially from one stage to the next in response to each pulse applied through an OR-gate 298 to the clock input of the ring counter. The stages of this ring counter are also interconnected so that when power is initially turned on, the counter stage 280, i.e., the sixth stage of the counter, is always energized.

A series of push button switches 282, 284, 286, 288, 290 and 292 are respectively associated with each of the six ring counter stages, each of these push buttons being so arranged that its contacts are closed unless the push button is depressed in which case the contacts of the push button are open, each push button being of the type which latches in the down position but may be released by depressing the button a second time. The push buttons 282 to 292, inclusive, are selectively depressed and latched in accordance with the desired sequence of programs to be selected for control of the associated manipulator apparatus. In the illustrated embodiment three work stations are accommodated and accordingly, push buttons 282, 284 and 286 are depressed, it being assumed that the programs corresponding to the first three work stations have been previously recorded in the memory drum during the teaching mode of operation of the manipulator apparatus, as described in detail in the above-identified copending Dunne, et al. application, Ser. No. 808,152.

Each of the ring counter stages is provided with a set of contacts, identified as LR–1, LR–2, etc., which correspond to the relay contacts LR–1, LR–2, etc. of the random program selection control system shown in FIGS. 2 and 3, the contacts associated with each ring counter stage being closed when that particular counter stage is energized. Each of the push button switches 282 to 292 is connected at one input of a six-input OR-gate 294 the output of which is connected to a one-shot multivibrator 296 which provides a pulse supplied to the other input of the two-input OR-gate 298. Also, the output of the reset driver 110 is connected through a set of normally closed relay contacts 308a of an override relay 308 to the OR-gate 298 and to one side of all of the counter contacts LR-1, LR-2, to LR-6, inclusive.

In the sequential skip type of system shown in FIGS. 9 and 10 the manipulator apparatus is not stopped after each program, as it was in the random program selection embodiment described in detail in connection with FIGS. 2 and 3. Accordingly, once power is turned on for the manipulator apparatus and the sixth counter stage 280 is energized, it is necessary to start the manipulator apparatus functioning and it would be desirable to always start with program No. 1 corresponding to the first counter stage 270. To this end, a push button start switch 350 is provided which has a first set of normally open contacts 352 and a second set of normally open contacts 354. When the start button 350 is depressed, the contacts 352 are closed and an input is supplied to the OR-gate 310 so that an initiate reset pulse is supplied to the OR-gate 104. At the same time the contacts 354 of the start button are closed so that a ground is supplied through the relay driver circuit 164 to the start relay 154 so that the contacts 152 thereof are closed, the relay 150 is energized, and the manipulator apparatus is prepared to function. When the contacts 352 are closed an input is also applied to set the flip-flop 122 and cause the one-shot multivibrator 126 to produce an artificial total coincidence signal which is supplied over the conductor 128 and through the OR-gate 96 to the control circuit 70 so that these control circuits function in the manner described in detail heretofore to produce a pulse on the conductor 108 which then enables the reset AND-gate 106. As a result, the reset driver 110 is energized and produces an output pulse which is supplied through the override relay contacts 308a to the OR-gate 298 and causes the ring counter to step from the sixth stage to the first stage 270. As soon as the first stage 270 is energized, the contacts LR-1 thereof are closed, so that the reset pulse, which persists after the counter stage 270 has been energized, acts as a ground pulse which is supplied through the LR-1 contacts and the OR-gate 83 to the home relay 80. The first program is thus selected by actuation of the home relay 80 in the manner described in detail heretofore in connection with FIGS. 2 and 3. The manipulator arm then proceeds through the above-described movements constituting the first program.

When a total coincidence signal is provided on completion of the next to last step of this program, the last program step is transferred to the buffer register and an end-of-program signal is supplied through the OR-gate 104 and the enabled reset AND-gate 106 to the reset driver 110. The reset driver responds by producing a ground signal which is supplied through the contacts 308a and the OR-gate 298 to the ring counter so as to step this counter to the second stage 272 whereupon the relay contacts LR-2 are closed and the ground signal is supplied through these contacts to the home relay 82. Accordingly, after the end of the 100 milliseconds step interval of the pulse on the conductor 108, the first step of program No. 2 is loaded into the shift register. When the manipulator arm has been moved to total coincidence of the last step of the first program another total coincidence signal is produced which is employed by the control circuits 70 to transfer step No. 1 of the second program to the buffer storage register, and produce a step pulse of 100 milliseconds on the conductor 108. As soon as step No. 1 of the new program is transferred to the buffer storage, the end-of-program signal disappears so that the AND-gate 114 is enabled and the step driver 116 is actuated. At the same time the relay selector system 68 is moved to the second read-write head and step No. 2 of program No. 2 is loaded into the shift register. The manipulator apparatus then proceeds to carry out the remainder of program No. 2.

At the end of program No. 2 a similar transfer is effected whereby the ring counter is stepped to the third stage 274, the contacts LR-3 are closed, and the third program is selected and steps No. 1 and No. 2 thereof stored in the buffer and shift registers, respectively. When the end of the third program is completed, the ring counter will be stepped to the fourth stage 276. However, since the push button associated with this stage has not been depressed, the contacts 288 thereof are closed so that a pulse is immediately supplied through the OR-gate 294 to the one-shot multivibrator 296 which develops a corresponding pulse which is transmitted through the OR-gate 298 and steps the ring counter immediately to stage 5. Since the push button 290 of stage No. 5 has likewise not been depressed, the counter is similarly shifted to stage No. 6 and since the push button 292 has not been depressed the counter is immediately shifted to stage No. 1, whereupon the manipulator apparatus carries out the first program again in the manner described in detail heretofore.

The above-described sequential type of operation will be carried out by the manipulator apparatus indefinitely unless one of the above-described external conditions has not been met. Considering first the situation where the work cycle completed switch 262 is closed when the manipulator arm reaches a position in front of a work station, such as the first work station 252, a condition is indicated under which the manipulator apparatus is to skip that work station and go on to the next one 254. When the manipulator arm reaches the position at which an interrogate signal has been previously recorded in the memory drum, i.e., before the manipulator arm is to enter the work station area of the work station 252, a signal will be produced on the conductor 318 as soon as the program step containing the interrogate signal is transferred to the buffer storage register. If the work cycle completed switch 262 is also closed at this time, indicating that the work cycle is still going on, a ground will appear on the conductor 316 and the AND-gate 314 to which these two signals are applied will produce an output which is used to set a flip-flop circuit 320.

When the flip-flop 320 is set, a signal is produced on the conductor 322 which is transmitted through the three-input OR-gate 310 and acts as an initiate reset pulse which is supplied to the OR-gate 104. This initiate reset signal is supplied to the OR-gate 104. This initiate reset signal is supplied to the reset AND-gate 106 while the previous 100 milliseconds step driver pulse from the control circuits 70 in response to the previously generated total coincidence signal still persists. Accordingly, the reset driver is operated, the ring counter is stepped to the next stage, i.e., the stage 272, the contacts LR-2 are closed, and the second program is selected, and the digital information corresponding to the first step of the second program is loaded into the shift resistor at the end of this 100 millisecond step pulse. The pulse controlling loading of each program step into the shift register lasts for approximately 33 milliseconds. Accordingly, a complete transfer, step and load sequence in the control circuits 70 lasts for approximately 133 milliseconds.

The flip-flop circuit 320 remains set for a period of time determined by a delay circuit 324 which is connected between the conductor 322 and the reset terminal of the flip-flop 320. In order to provide facilities for transferring step No. 1 of program 2 into the buffer register and loading step No. 2 of the second program into the shift register in response to the initiate reset signal supplied to the OR-gate 104, the delay in the circuit 324 is chosen to be approximately 115 milliseconds long. Accordingly, the initiate reset signal applied to the OR-gate 104 disappears before the end of the complete transfer-step-load cycle of the control circuits 70. Therefore, when a total coincidence signal is produced in response to completion of movement of the manipulator arm to the program step which includes the interrogate signal, the total coincidence signal thus produced is transmitted through the OR-gate 96 and the control circuits 70 respond thereto by producing another 100 millisecond step driver pulse on the conductor 108. The step driver AND-gate 114 is then enabled so as to shift the relay selector system 68 to the second step in the second program which is then loaded into the shift register, the step No. 1 of this program having been previously transferred into the buffer storage. It will thus be seen that in response to closure of the switch 262 the facilities of FIGS. 9 and 10 function to initiate reset which causes the manipulator apparatus to shift to the next program in the sequence without completing the first program.

If the work cycle complete switch 262 is closed at the second work station when the manipulator arm is moved to the interrogate position associated with this station, the same operation as described above will occur so that the remainder of the second program is skipped, the third program is selected and the manipulator apparatus is moved to the third work station. The manipulator apparatus thus continues to hunt for a work station which is available, i.e., one in which the work cycle complete switch 262 is open, and then proceeds to carry out that program.

The second external condition which is arranged to cause the manipulator apparatus to skip the remainder of the program and go on to the next one in the sequence, is when a particular work station is not ready to load, the manipulator apparatus having previously unloaded a part from that work station and obtained a new part from that work station and obtained a new part from the pickup station 250. If, in the meantime, a mechanic has taken advantage of the availability of the work station to begin changing or adjusting tools, the ready to load switch 264 at that work station will be closed. Accordingly, a signal will be supplied over the conductor 302 to one input of a two-input AND-gate 300. When the manipulator arm is moved to the interrogate position of that program, and assuming again that that program is the first program, an input is supplied over the conductor 304 and the AND-gate 300 is enabled and triggers a flip-flop 306 to the set position so that an override relay 308 is energized in response to setting of the flip-flop 306. When this occurs, the contacts 308a of the override relay are opened and the normally open contacts 308b thereof are closed. At the same time that the override relay 308 is energized a signal is supplied to another input of the OR-gate 310 which functions to provide an initiate reset signal to the OR-gate 104 in the manner described previously. Accordingly, at the start of the program step containing the interrogate signal the reset driver 110 is actuated but its pulse is now supplied through the contacts 308b to the selector arm of an override selector switch 356. The selector switch 356 may be employed to select any one of the six program stages of the ring counter. In the illustrated embodiment it is assumed that the sixth program is the one in which the manipulator arm has been programmed to carry the part, which was to be placed in the now unavailable work station, over to the reject chute 260 and deposit it therein. Accordingly, the selector switch 356 would be adjusted to the sixth position so that the reset signal supplied through the contacts 308b will be transmitted directly to the OR-gate 87 and the OR-gate associated with the home relay 84 so that the corresponding settings for selection of the sixth program are provided, it being understood that a ground on the sixth position of the selector switch 356 acts the same as if the contacts LR–6 were closed and a ground supplied through the contacts 308a. The first step of the sixth program is then loaded into the shift register at the end of the 100 millisecond step pulse produced by the control circuits 70. The flip-flop 306 is reset through a delay circuit 312 so that when a total coincidence signal is developed at the end of the program step which includes the interrogate signal the step driver AND-gate 114 will be enabled and the step driver 116 actuated so that the second step of the sixth program is loaded into the shift register after the first step thereof has been transferred to the buffer storage. The manipulator apparatus then proceeds to carry out the sixth program as described above. However, the setting of the ring counter is not changed when the sixth program is selected through the override selector switch 356 since the contacts 308a of the override relay 308 are opened, as described above. Accordingly, when the last step of the sixth program is transferred to the buffer storage register and a reset pulse is developed by the reset driver, in the manner described heretofore, this pulse will be transmitted through the contacts 308a of the override relay 308 since this relay was de-energized when the flip-flop 306 was reset by the delay circuit 312. The reset pulse transmitted through the contacts 308a and the OR-gate 298 steps the ring counter to stage No. 2 and the manipulator apparatus will then proceed on to work station 254. Since the manipulator arm has now deposited the part which was previously intended for work station 252 in the reject chute 260, it is now free to proceed to work station 254, unload the part therein and reload it from the pickup station 250.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator apparatus, the combination of, a manipulator arm, means for moving said arm in a plurality of axes, a magnetic storage medium, means for recording a series of different programs on said medium, each of said programs comprising a series of program steps for moving said arm over a predetermined path, means for recording an end-of-program signal on said medium in association with the last step of each of said programs, means for sequentially sensing said recorded program steps and controlling said moving means to move said arm to positions corresponding to said recorded program steps, means responsive to sensing of an end-of-program signal at the last step of any one of said programs for producing a first control signal, means for developing a second control signal representing any other one of said programs, and means jointly responsive to said first and second control signals for controlling said sensing means to sense the first step of said other one program.

2. The combination of claim 1, wherein said apparatus is arranged to operate with any one of a plurality of different devices corresponding to said different programs, means associated with each of said devices for developing a use signal indicating the availability of that device, and means responsive to said use signal for controlling said second control signal developing means.

3. The combination of claim 2, wherein there is provided means for selecting said use signals from said devices in a predetermined sequence and controlling said second control signal developing means from said selected use signal.

4. The combination of claim 1, wherein there is provided means external to said manipulator apparatus for selecting which one of said programs is to be used to control said apparatus, and means responsive to said last named means for developing said second control signal.

5. The combination of claim 1, wherein said apparatus is arranged to cooperate with a conveyor on which different types of objects are carried, said series of recorded programs corresponding to said different types of objects, means for indicating the type of object carried by said conveyor at a particular point therealong, and means controlled by said indicating means for developing said second control signal, whereby said manipulator arm performs an operation with respect to each of said objects in accordance with the type thereof.

6. The combination of claim 5, wherein different types of said objects are randomly positioned on said conveyor.

7. In a programmed manipulator apparatus, the combination of, a manipulator arm, means for moving said arm in a plurality of axes, a recorder having a series of program steps and associated control signals stored therein, said control signals being recorded in association with each program step at which an operation of a given type is to be performed, means for sequentially sensing said recorded program steps, means controlled by said sensing means for controlling said moving means to move said arm to the position indicated by the sensed program step, means for developing a total coincidence signal when movement of said arm in all of said axes has been completed for the sensed program step, means for sensing a control signal which is recorded in association with one of said program steps, means responsive to said sensed control signal for initiating an operation of said given type, and means controlled in part by said last named means for delaying the development of said total coincidence signal until after said operation has been completed.

8. The combination as set forth in claim 7, which includes an output circuit for said total coincidence signal developing means, means controlled by said control signal sensing means for disabling said output circuit, means jointly responsive to said sensed control signal and completion of movement of said arm in all of said axes for initiating said operation, means for developing a completion signal in response to completion of said initiated operation, means operative in response to said completion signal for enabling said output circuit, and means responsive to a total coincidence signal output at said output circuit for controlling said sensing means to sense the next recorded program step.

9. The combination of claim 8, wherein there is provided means for preventing the initiation of two of said operations at a position corresponding to the same program step.

10. The combination as set forth in claim 7, which includes an output circuit for said total coincidence signal developing means, means responsive to the sensing of one of said control signals for disabling said output circuit, and AND-gate arranged to develop an output signal in response to a sensed control signal and completion of movement of said arm in all of said axes, means controlled by said output signal for initiating said operation and substantially concurrently inhibiting said AND-gate, thereby to prevent a further initiation of said operation at the same program step, means for developing a completion signal in response to completion of said initiated operation, means operative in response to said completion signal for enabling said output circuit, means responsive to a total coincidence signal output at said output circuit for controlling said sensing means to sense the next recorded program step, and means responsive to said last named means for enabling said AND-gate.

11. The combination of claim 10, which includes a flip-flop circuit, means for setting said flip-flop circuit in response to said output signal, means responsive to setting of said flip-flop circuit for inhibiting said AND-gate, and means responsive to said total coincidence signal output for resetting said flip-flop circuit, thereby to enable said AND-gate for the next program step.

12. The combination of claim 7, wherein said manipulator arm carries a pair of spot welding jaws arranged to engage a workpiece adjacent said manipulator apparatus, said operation is a spot welding operation during which said jaws are engaged with a portion of the workpiece, and development of said total coincidence signal is delayed until said jaws have been opened after the spot weld has been completed.

13. The combination of claim 12, wherein there is provided means for preventing a double spot weld in response to a single sensed one of said control signals.

14. In a programmable manipulator apparatus, the combination of, a manipulator arm, means for moving said arm in a plurality of axes, a recorder having stored therein a series of different programs, each of said programs comprising a series of multi-digit program steps and an end-of-program signal in association with the last step of each of said programs, sensing means for individually sensing said recorded program steps, program selecting means for controlling said sensing means to sense the steps of any randomly selected one of said programs, reset means normally operative in response to said end-of-program signal for causing the program associated therewith to be repeated, means for controlling said moving means to terminate movement of said arm after a given program has been completed, means external to said manipulator apparatus for controlling said program selecting means to select at random one of said programs, means controlled by said last-named means for actuating said reset means to said one selected program, and means for thereafter releasing said arm to follow the program steps of said one selected program.

15. The combination of claim 14, wherein there is provided temporary storage means in which the digits of each recorded step are temporarily stored while said arm is completing the movement indicated by that step, the first step of a program to be repeated normally being stored in said temporary storage means in response to said end-of-program signal, and means responsive to said external means for removing the first step of the previously completed program from said temporary storage means and storing the first step of the newly selected program therein.

16. The combination of claim 15, wherein said temporary storage means comprises first and second storage registers and the first and second steps of the newly selected program are supplied to said first and second registers respectively prior to the release of said arm by said releasing means.

17. The combination of claim 14, which also includes a conveyor for moving a series of objects in relation to said manipulator apparatus in step-by-step fashion, said objects being of different types corresponding to different ones of said programs, and said external means comprises a sensing station in association with said conveyor for sensing the type of object on said conveyor and controlling said program selecting means in accordance with the sensed object type.

18. The combination of claim 17, wherein said objects comprise metal frames of different types which require different patterns of spot welds and said plurality of programs include recorded program steps corresponding to said different spot weld patterns.

* * * * *